Jan. 18, 1955      F. H. BRILLIANT      2,699,845
FLUID SHOCK ABSORBER FORMED OF SHEET METAL
Filed July 16, 1952      2 Sheets-Sheet 1
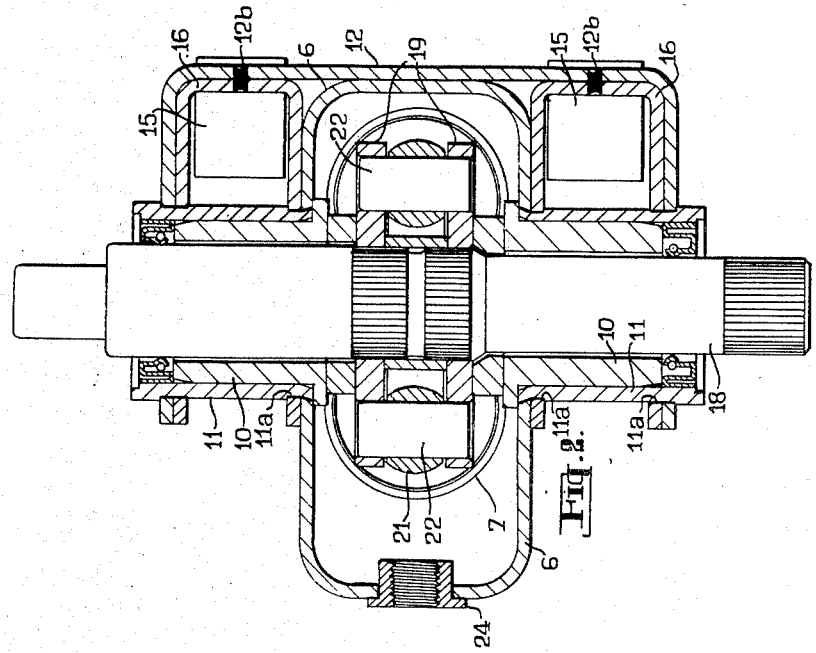
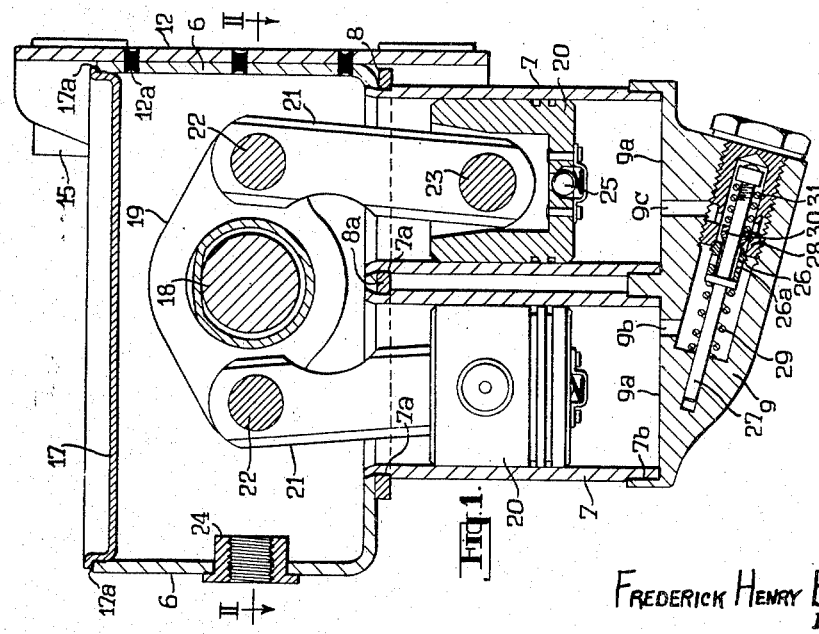
Frederick Henry Brilliant
Inventor
By John James Victor
Armstrong
Attorney

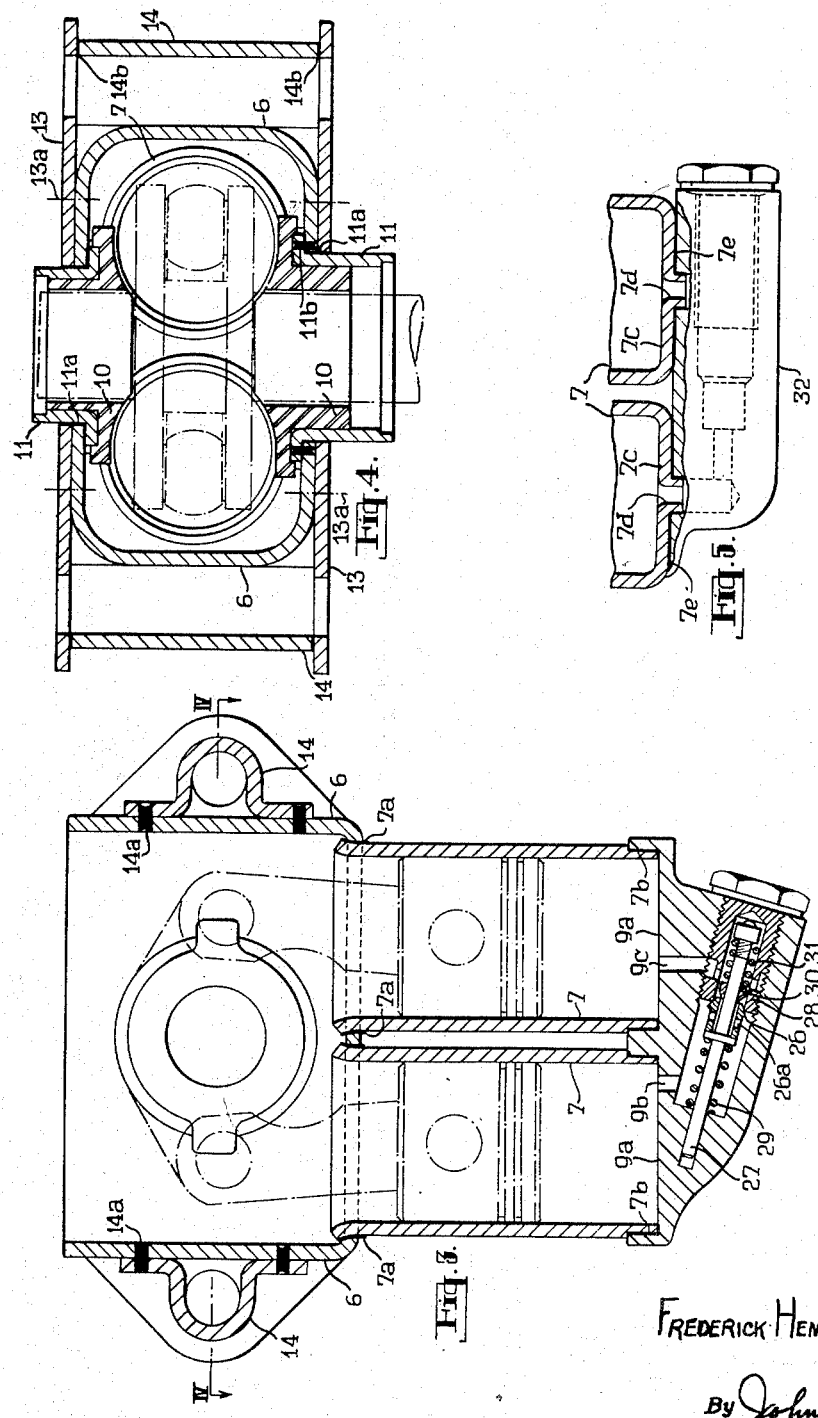

United States Patent Office 2,699,845
Patented Jan. 18, 1955

2,699,845
FLUID SHOCK ABSORBER FORMED OF SHEET METAL

Frederick Henry Brilliant, Beverley, England, assignor to Armstrong Patents Co. Limited, a British company Application July 16, 1952, Serial No. 299,192

2 Claims. (Cl. 188—88)

The present invention relates to an improved fluid shock absorber of the type in which shocks are damped by the displacement of a piston or the like means effecting the transfer of a fluid from one chamber to another.

Hydraulic shock absorbers of this type are in general use in connection with automobile vehicles and include a housing cast from a metal or an alloy adapted to be secured to the frame of an automobile vehicle and enclosing a pair of piston chambers and valve means for restraining flow of fluid therebetween, following displacement of a piston or pistons therein connected by a linkage or the like means to a moving member of the automobile vehicle suspension system, as for example the wheel axle.

Hitherto it has been usual to form the said housing by casting from an alloy.

According to the present invention the elements of a hydraulic or the like fluid shock absorber housing are stamped, pressed or drawn from ductile sheet metal, such as thin sheet steel, and are united along interengaging areas to form an integral unit by flowing a metal or alloy therebetween. The expression "flowing a metal or alloy" includes brazing and welding.

In one form of the invention, the elements of the hydraulic or the like fluid shock absorber housing include a crank chamber and a pair of piston cylinders communicating therewith.

In another form of the invention, the elements of the shock absorber housing include a pair of piston cylinders and a valve housing communicating therewith by means of passages. The cylinders may have pierced walls at one end extending into nipples received within recesses in the valve housing. Alternatively the valve housing may be provided with nipples extending through the holes in the cylinder end walls and being flared inside the cylinders to prevent withdrawal therefrom. In either case, the relative proportion of the area of the interengaging surfaces of the piston cylinders and the valve housing and the area of the communicating passages between said cylinders and housing may be equal to or greater than 9:1.

In a preferred form of the invention, each cylinder may be open at both ends, one end communicating with the crank chamber, the other seating in a recess in the valve housing.

A reinforcing plate, or plates serving for attachment of the shock absorber housing to an automobile vehicle may be secured to the crank chamber by brazing or welding. Sleeve parts for the passage of securing bolts may be brazed or welded to the outer sides of the crank chamber and to the reinforcing plate or plates.

The crank chamber sides may be pierced to receive the bearing bushes for an oscillating shaft, the action of which will be later described. Such bushes may again be brazed or welded to the crank chamber and to the plate or plates. A cover plate or lid for the open end of the crank chamber may be similarly welded or brazed thereto.

Several embodiments of the invention will now be more fully described by reference to the accompanying drawings in which:

Fig. 1 is a sectional view of an assembly of elements of a hydraulic shock absorber housing according to the invention, wherein the essential working parts are also shown.

Fig. 2 is a section along the line II—II of Fig. 1.

Fig. 3 is a sectional view of an alternative assembly of elements,

Fig. 4 is a section along the line IV—IV of Fig. 3, and

Fig. 5 is a fragmentary view illustrating a modification of the junction between the piston cylinders and valve housing shown in Fig. 3.

Referring first to the actual shock absorber housing (Figs. 1-4) a crank chamber 6 is brazed to a pair of piston cylinders 7 at the slightly bell mouthed ends thereof along interengaging areas 7a. In the embodiment shown in Fig. 1, the joint is strengthened by ring member 8, comprising two rings fused together at 8a, also brazed to the crank chamber 6 and cylinders 7.

The ends of the piston cylinders remote from the crank chamber 6 are seated in recesses 9a of a valve housing 9 (Figs. 1 and 3) being copper brazed thereto along interengaging areas at open ends 7b of cylinders 7.

A convenient method of carrying out this brazing is to place rings of copper round the joints and pass the housing, on an endless conveyor belt, through a reduced atmosphere furnace, the temperature in which rises to 1200° C. and then falls again before the housing emerges. Under these conditions the copper melts and flows along the joints or interengaging areas.

Crank chamber 6 is pierced to receive a bearing assembly comprising bearing bushes 10 mounted in bearing sleeves 11 (Figs. 2 and 4) brazed at 11a and welded at 11b (Fig. 4 only) to crank chamber 6. Reinforcing metal plates 12 (Figs. 1 and 2), 13 (Fig. 4), serving for attachment of the housing to an automobile vehicle, are respectively projection and spot welded at points 12a and 13a to crank chamber 6. Ring member 8 may also serve to braze plate 12 to chamber 6 while plates 12, 13 are, in addition, brazed at 11a to bearing sleeve 11. A pair of sleeve parts 14 (Figs. 3 and 4), are welded at 14a to crank chamber 6 and at 14b to plates 13, said sleeve parts being provided for the passage of securing bolts. Similar sleeve parts 15 welded to plates 12 are diagrammatically illustrated in Figs. 1 and 2. U-shaped reinforcing members 16 (Fig. 2) are welded at 12b and brazed at 11a to plate 12 and bearing sleeve 11 respectively. A lid 17 (Fig. 1) is welded at 17a to crank case 6.

Referring now to the working parts illustrated in Figs. 1 and 2, a rotatable shaft 18, mounted in bearing bushes 10, is rotated by shock transmitted from the vehicle in which the shock absorber is mounted (not shown). A yoke 19, mounted on shaft 18, is connected to pistons 20, slidably confined within piston cylinders 7, by means of links 21, pivotally connected to yoke 19 and pistons 20 by pivot pins 22, 23 respectively. Oil introduced under pressure to crank chamber 6 through inlet member 24 brazed thereto, passes, through non-return valves 25 in pistons 20, inlet member 24 being closed when the shock absorber is completely filled. Rotation of shaft 18 causes displacement of oil from one cylinder to the other via passages 9b, 9c and the interior of valve housing 9 owing to movement of the pistons 20. Oil flowing from 9b to 9c, passing through passages 26a, in a conical piston head 26, slidably mounted on a shaft 27 in housing 9 and held in abutment with a collar 28 by means of a spring 29, unseats a piston head 30 (which closes passages 26a) slidably mounted on shaft 27 and normally held in abutment with piston head 26 by means of a spring 31. Oil flowing in the reverse direction unseats piston head 26 and enters passages 26a. In this way a two way valve is provided between the two cylinders.

In Fig. 5, end walls 7c of piston cylinders 7 extend into nipples 7d seated in a valve housing 32 of similar construction to valve housing 9. The cylinders are brazed to the housing at 7c.

The working parts shown in Figs. 1 and 2 may also be employed with slight modification in the embodiment illustrated in Figs. 3 and 4 as indicated by the chain dotted lines therein.

It will consequently be seen that by the present invention an hydraulic shock absorber body can be manufactured, the major parts of which are formed from sheet metal and which presents a hollow one-piece body which will be strong and yet very light and also cheap in manufacture as compared with the hitherto known method of manufacturing such bodies by casting from metals or alloys.

The parts are all arranged to have mechanically interengaging parts so that they can be readily assembled and loosely held in the relationship which they eventually occupy when united to form an integral unit.

I claim:

1. A fluid shock absorber housing comprising a pair of parallel piston cylinders formed from sheet metal and open at both ends, a crank chamber formed from sheet metal and brazed to one pair of adjacent open ends of said cylinders along inter-engaging areas, the ends of the cylinders engaging with the crank chamber being substantially bell-mouthed to provide an additional purchase between said cylinders and crank chamber, a bearing assembly for a rotatable shaft mounted in said crank chamber and united thereto by means of at least one of the operations selected from the group consisting of brazing and welding, a reinforcing plate welded to said crank chamber, a pair of sleeve parts welded to said reinforcing plate for the passage of securing bolts, a valve housing into which the other pair of adjacent open ends of said cylinders are recessed, and brazing between inter-engaging areas of said cylinders and valve assembly.

2. A fluid shock absorber housing comprising a pair of parallel piston cylinders formed from sheet metal and open at both ends, a crank chamber formed from sheet metal and brazed to one pair of adjacent open ends of said cylinders along interengaging areas, the ends of the cylinders engaging with the crank chamber being substantially bell-mouthed to provide an additional purchase between said cylinders and crank chamber, a bearing assembly for a rotatable shaft mounted in said crank chamber and united thereto by means of at least one of the operations selected from the group consisting of brazing and welding, a reinforcing plate welded to said crank chamber, a pair of sleeve parts welded to said reinforcing plate and to said crank chamber for the passage of securing bolts, a valve housing into which the other pair of adjacent open ends of said cylinders are recessed, and brazing between inter-engaging areas of said cylinders and valve assembly.

References Cited in the file of this patent

UNITED STATES PATENTS

| Number | Name | Date |
|---|---|---|
| 1,842,821 | Chryst | Jan. 26, 1932 |
| 1,871,954 | Chryst | Aug. 16, 1932 |
| 2,011,121 | Sherman et al. | Aug. 13, 1935 |
| 2,049,119 | Home | July 28, 1936 |
| 2,072,173 | Lottritz | Mar. 2, 1937 |
| 2,199,423 | Taylor | May 7, 1940 |
| 2,291,420 | Swenson | July 28, 1942 |
| 2,341,488 | Taylor | Feb. 8, 1944 |
| 2,444,963 | Taylor | July 13, 1948 |
| 2,511,823 | Klotsch | June 13, 1950 |

FOREIGN PATENTS

| Number | Country | Date |
|---|---|---|
| 760,458 | France | Feb. 3, 1934 |